(12) United States Patent
Okura et al.

(10) Patent No.: US 10,030,365 B2
(45) Date of Patent: Jul. 24, 2018

(54) VALVE ARRANGEMENT STRUCTURE OF CONSTRUCTION MACHINE

(71) Applicant: KOBELCO CONSTRUCTION MACHINERY CO., LTD., Hiroshima-shi (JP)

(72) Inventors: Hideyuki Okura, Hiroshima (JP); Masafumi Yoneda, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 15/434,690

(22) Filed: Feb. 16, 2017

(65) Prior Publication Data

US 2017/0254048 A1 Sep. 7, 2017

(30) Foreign Application Priority Data

Mar. 1, 2016 (JP) .................... 2016-038664

(51) Int. Cl.
*E02F 9/22* (2006.01)
*F16K 31/40* (2006.01)
*E02F 3/32* (2006.01)

(52) U.S. Cl.
CPC .......... *E02F 9/2267* (2013.01); *E02F 9/2285* (2013.01); *F16K 31/408* (2013.01); *E02F 3/32* (2013.01)

(58) Field of Classification Search
CPC .................................................. E02F 9/0875
See application file for complete search history.

(56) References Cited

U.S. PATENT DOCUMENTS

| 3,370,815 | A | * | 2/1968 | Opperthauser | ........... | F16L 3/13 |
| | | | | | | 138/106 |
| 6,223,841 | B1 | * | 5/2001 | Susag | ................... | B60K 25/00 |
| | | | | | | 180/53.4 |
| 7,854,284 | B2 | * | 12/2010 | Wada | ..................... | E02F 9/121 |
| | | | | | | 180/327 |
| 8,042,638 | B2 | * | 10/2011 | Tanaka | ................... | E02F 3/301 |
| | | | | | | 180/326 |

(Continued)

FOREIGN PATENT DOCUMENTS

| JP | 3273537 | 4/2002 |
| JP | 2003-336769 A | 11/2003 |

(Continued)

OTHER PUBLICATIONS

Office Action dated Nov. 14, 2017 in Japanese Patent Application No. 2016-038664 (with English language translation).

(Continued)

*Primary Examiner* — John Fox
(74) *Attorney, Agent, or Firm* — Oblon, McClelland, Maier & Neustadt, L.L.P.

(57) ABSTRACT

A solenoid valve is supported by a supporting bracket at a position above a control valve. An erected section of the supporting bracket is arranged at a position separated from the control valve in a horizontal direction so as not to overlap with a hydraulic port in the control valve in a side view. A plurality of pilot pipes connected to the solenoid valve are held by a guide section in a bundled state so that the pilot pipes are routed in a vertical direction along the erected section.

9 Claims, 8 Drawing Sheets

(56) References Cited

U.S. PATENT DOCUMENTS

| | | | | |
|---|---|---|---|---|
| 8,757,956 | B2* | 6/2014 | Thompson | E02F 9/2275 |
| | | | | 138/110 |
| 9,016,161 | B2* | 4/2015 | Sakurahara | E02F 9/0833 |
| | | | | 74/496 |
| 9,255,383 | B2* | 2/2016 | Go | E02F 9/2275 |
| 2008/0282586 | A1 | 11/2008 | Wada et al. | |
| 2014/0186151 | A1 | 7/2014 | Ootsuka et al. | |
| 2014/0252179 | A1 | 9/2014 | Go et al. | |

FOREIGN PATENT DOCUMENTS

| | | | |
|---|---|---|---|
| JP | 2006-183386 A | 7/2006 | |
| JP | 2008-285829 A | 11/2008 | |
| JP | 2010-90652 A | 4/2010 | |
| JP | 2014-214540 A | 11/2014 | |
| JP | 2014-535015 A | 12/2014 | |
| WO | WO 2013/069628 A1 | 5/2013 | |

OTHER PUBLICATIONS

Extended European Search Report dated Jul. 25, 2017 in Patent Application No. 17156815.7.

* cited by examiner

VALVE ARRANGEMENT STRUCTURE OF CONSTRUCTION MACHINE

TECHNICAL FIELD

The present invention relates to a valve arrangement structure of a construction machine.

BACKGROUND ART

Conventionally, a valve arrangement structure of a construction machine including a control valve which is connected to a hydraulic device via a hydraulic pipe and a solenoid valve which is connected to the control valve via a pilot pipe is known (for example, Japanese Patent No. 3273537).

Japanese Patent No. 3273537 discloses a configuration including a multiple valve as a control valve unit which is arranged on a slewing frame via a supporting bracket and a solenoid valve integrally provided in an upper part of a side surface of the multiple valve.

However, with the invention disclosed in Japanese Patent No. 3273537, the solenoid valve is arranged in the upper part of the side surface of the multiple valve and, at the same time, the pilot pipe is routed from the solenoid valve toward the multiple valve in a disorderly manner. Therefore, there is a risk that the pilot pipe routed along the side surface of the multiple valve and the hydraulic pipe connected to the side surface of the multiple valve may become entangled.

In addition, since the pilot pipe expands in a direction perpendicular to an axial direction of the pilot pipe due to force which the pilot pipe receives from oil when oil circulates in the pilot pipe, a large routing space must be secured in consideration of such expansion.

SUMMARY OF INVENTION

An object of the present invention is to enable routing of pilot pipes while suppressing entanglement with a hydraulic pipe and reducing space necessary for routing of the pilot pipes.

The present invention provides a valve arrangement structure of a construction machine, including: a control valve connected to a hydraulic device via a hydraulic pipe; a solenoid valve connected to the control valve via a plurality of pilot pipes; a valve supporting member which supports the control valve from below the control valve; and a supporting bracket which supports the solenoid valve so that the solenoid valve is positioned above the control valve, wherein a hydraulic port to which the hydraulic pipe is connected is provided on a lateral connection surface of the control valve, and the supporting bracket includes: an erected section which is erected at a position separated from the connection surface of the valve supporting member in a horizontal direction so as not to overlap with the connection surface in a viewpoint along a direction perpendicular to the connection surface and which extends in a vertical direction from the valve supporting member to a position higher than an upper surface of the control valve; a placing section which extends from an upper end section of the erected section so as to be arranged at a position higher than the upper surface of the control valve and on which the solenoid valve is placed; and at least one guide section which is provided in the erected section, which holds the pilot pipes in a bundled state so that the pilot pipes are routed in the vertical direction along the erected section, and which restricts the pilot pipes from moving in at least a direction separating from the control valve.

According to the present invention, the erected section and the solenoid valve can be arranged in a state where the connection surface of the control valve is opened sideways and, at the same time, the pilot pipes can be held in a bundled state to the erected section arranged in this manner. Therefore, since the pilot pipes can be routed in an orderly manner at a position (the erected section) separated from the connection surface (the hydraulic pipe), a routing operation of the pilot pipes can be readily performed while suppressing entanglement of the hydraulic pipe and the pilot pipes. In addition, since movement of the pilot pipes in at least a direction separating from the control valve can be restricted by the guide section, a space necessary for routing the pilot pipes can be reduced.

DESCRIPTION OF EMBODIMENTS

Hereinafter, embodiments of the present invention will be described with reference to the drawings. It should be noted that the following description of the preferred embodiments substantially represent examples and are not intended to limit the present invention, articles to which the present invention is applied, and applications of the present invention. In the respective drawings, upward, downward, forward, rearward, leftward, and rightward directions are indicated by arrows. Unless otherwise noted, directions such as upward and downward will be described in accordance with the directions indicated by the arrows.

Figure 1:
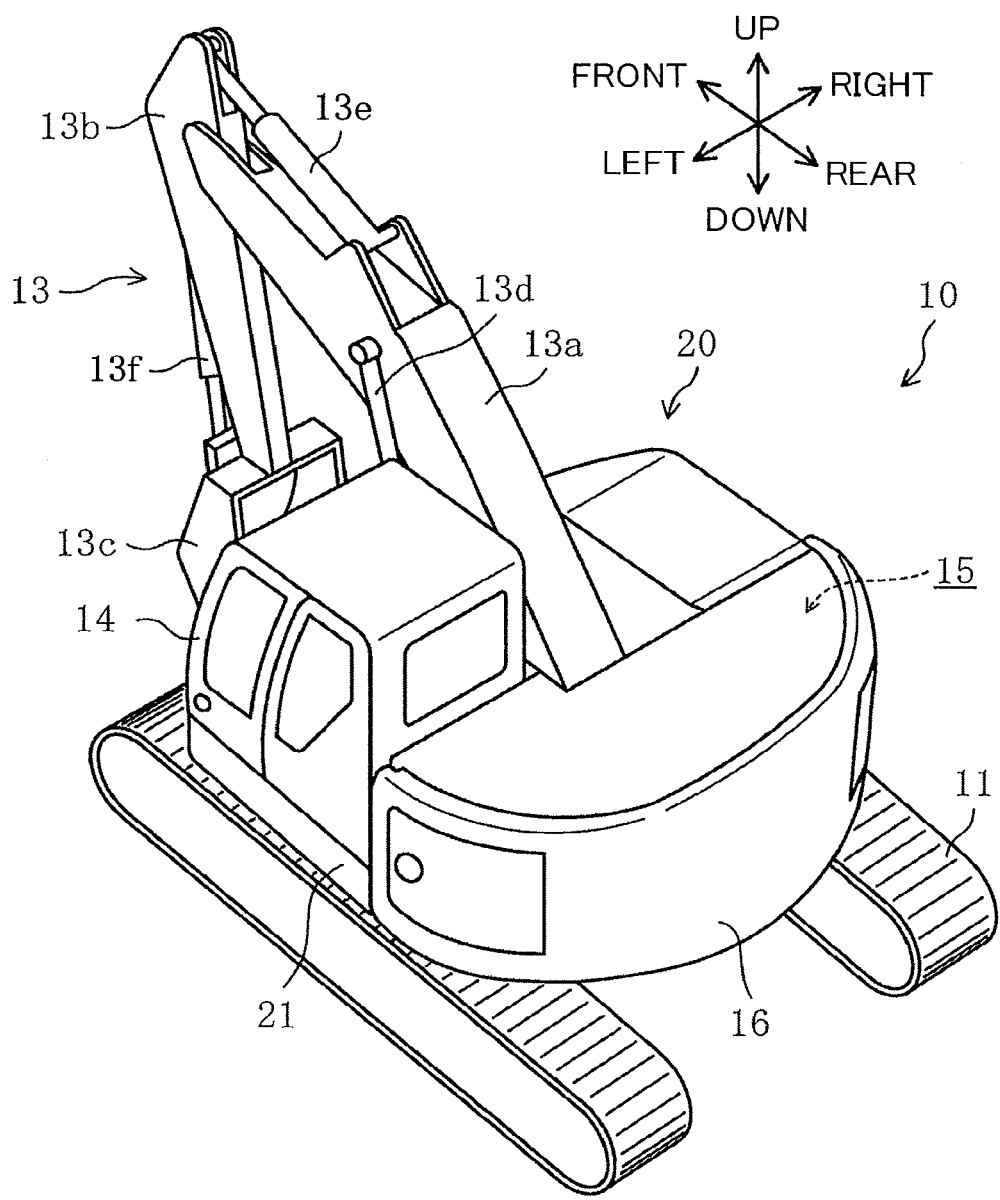
FIG. 1 is a perspective view showing an overall configuration of a construction machine according to an embodiment of the present invention.

As shown in FIG. 1, a construction machine 10 includes a crawler-type lower traveling body 11 and an upper slewing body 20 rotatably mounted on the lower traveling body 11. The upper slewing body 20 is provided with an attachment 13, a cab 14, a machine room 15, an upper frame 21, and the like.

The attachment 13 is installed in a front section of the upper slewing body 20. Specifically, the attachment 13 includes a boom 13a having a base end section being rotatably attached to the upper frame 21, an arm 13b having a base end section being rotatably attached to a distal end section of the boom 13a, and a bucket 13c being rotatably attached to a distal end section of the atm 13b. Each of the boom 13a, the arm 13b, and the bucket 13c operate in conjunction with the extension and contraction of hydraulically controlled cylinders 13d to 13f (hydraulic devices) and, accordingly, work such as excavation is carried out. Specifically, the attachment 13 includes a boom cylinder 13d which causes the boom 13a to rotate relative to the upper frame 21, an arm cylinder 13e which causes the atm 13b to rotate relative to the boom 13a, and a bucket cylinder 13f which causes the bucket 13c to rotate relative to the atm 13b. The attachment 13 is operated from the cab 14.

The cab 14 is a rectangular box-shaped operating room which is installed adjacent to the attachment 13 in a front left section of the upper slewing body 20 (the upper frame 21). The machine room 15 is provided in a rear section of the upper slewing body 20. The upper slewing body 20 includes a machine room cover 16 which covers a periphery of the machine room 15. The construction machine 10 includes a counterweight (not assigned a reference numeral) for ensuring front-rear balance with the attachment 13, and a part of the machine room cover 16 which covers a rear section of the machine room 15 is constituted by the counterweight.

Figure 2:
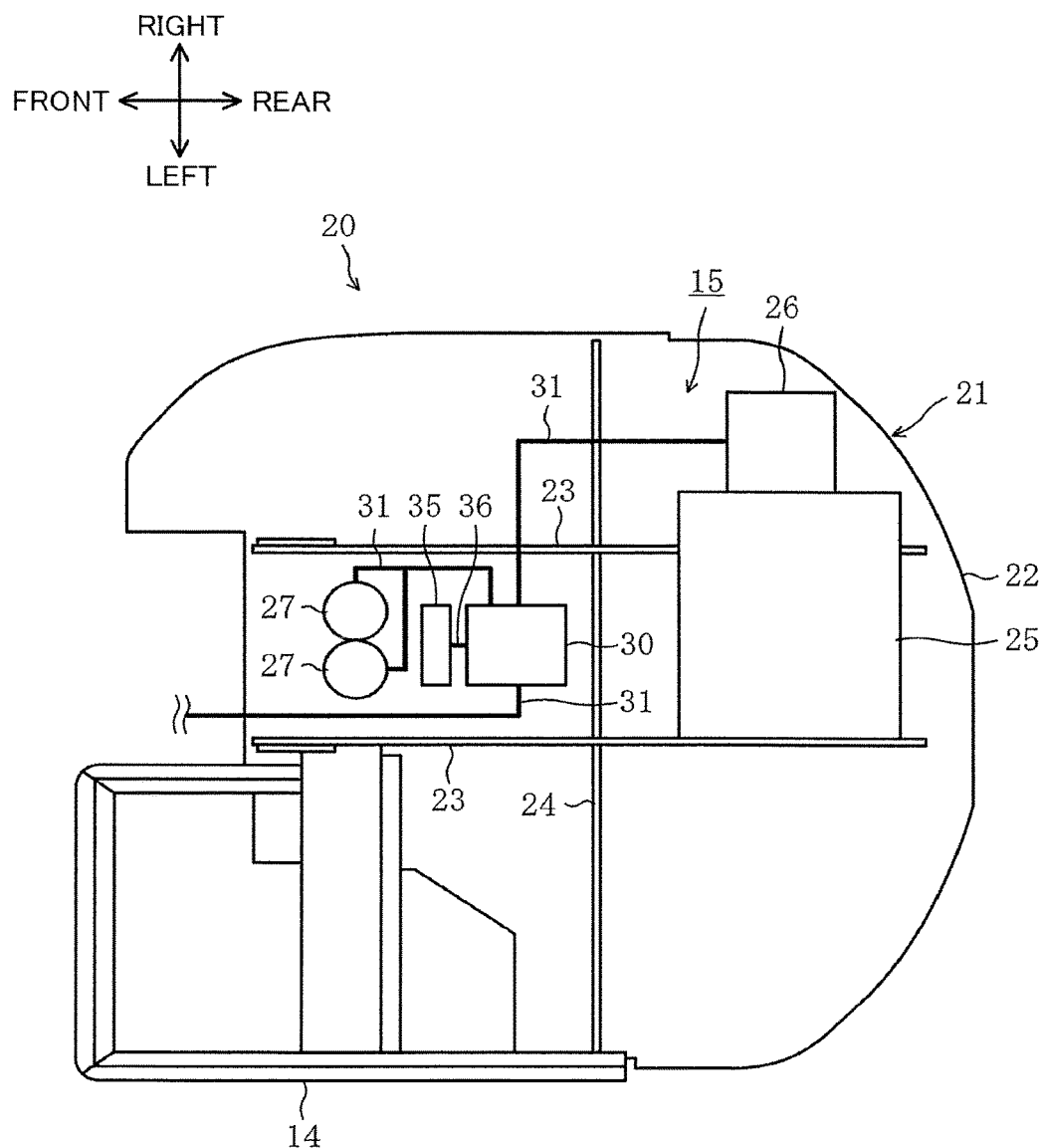
FIG. 2 is a plan view showing a configuration of an upper slewing body.

As shown in FIG. 2, the upper frame 21 includes a bottom plate 22, a pair of vertical plates 23, and a horizontal beam 24. The pair of vertical plates 23 extends such that the vertical plates 23 are parallel to each other in a front-rear direction from a front end portion to a rear end portion of the bottom plate 22 in an intermediate portion in a left-right direction (a width direction) of the bottom plate 22. A base end section of the boom 13a is inserted between the vertical plates 23 and is rotatably supported against both vertical plates 23 by a boom foot pin (not illustrated) which extends in the left-right direction. Lower end sections of the vertical plates 23 are welded to the bottom plate 22 in a state where the vertical plates 23 are perpendicular to the bottom plate 22. Accordingly, the vertical plates 23 are erected on the bottom plate 22.

The horizontal beam 24 is arranged so as to extend in a left-right direction (a width direction) from the left end portion to the right end portion of the bottom plate 22 in an intermediate portion in a front-rear direction of the bottom plate 22. In addition, the horizontal beam 24 is integrally joined to the bottom plate 22 and the pair of vertical plates 23.

An engine 25 is housed inside the machine room 15 so that a driving shaft of the engine 25 is oriented in the left-right direction of the bottom plate 22. A hydraulic pump 26 (a hydraulic device) is arranged to the right side of the engine 25.

The upper slewing body 20 includes a control valve 30, a solenoid valve 35, and a slewing motor 27 (a hydraulic device) which are respectively provided between the pair of vertical plates 23. The control valve 30, the solenoid valve 35, and the slewing motor 27 are arranged aligned in a front-rear direction. Two slewing motors 27 are arranged aligned in a left-right direction.

The hydraulic pump 26 and the control valve 30 are connected to each other via a hydraulic pipe 31. The hydraulic pump 26 discharges operating oil and pressure-feeds the operating oil to the control valve 30 via the hydraulic pipe 31.

The control valve 30 and the solenoid valve 35 are connected to each other via pilot pipes 36. The control valve 30 controls an amount of operating oil to be supplied to hydraulic devices including the cylinders 13d to 13f and the slewing motor 27 in accordance with pilot hydraulic pressure output from the solenoid valve 35.

Specifically, when an operator operates an operation lever (not illustrated) provided inside the cab 14, an opening of the solenoid valve 35 is adjusted in accordance with the operation amount and pilot hydraulic pressure in accordance with the opening is output. The control valve 30 supplies operating oil discharged from the hydraulic pump 26 to operate hydraulic devices such as the cylinder 13d to a corresponding hydraulic device such as the cylinder 13d.

The control valve 30 and the solenoid valve 35 are favorably arranged in proximity to each other in consideration of operability for routing the pilot pipes 36. However, depending on a positional relationship between the control valve 30 and the solenoid valve 35, the pilot pipes 36 and the hydraulic pipe 31 may become entangled.

Therefore, in the present embodiment, the arrangement of the control valve 30 and the solenoid valve 35 is devised so that the pilot pipes 36 and the hydraulic pipe 31 can be routed while preventing the pipes 31 and 36 from becoming entangled. Hereinafter, a valve arrangement structure of the construction machine 10 according to the present embodiment will be described.

Figure 3:
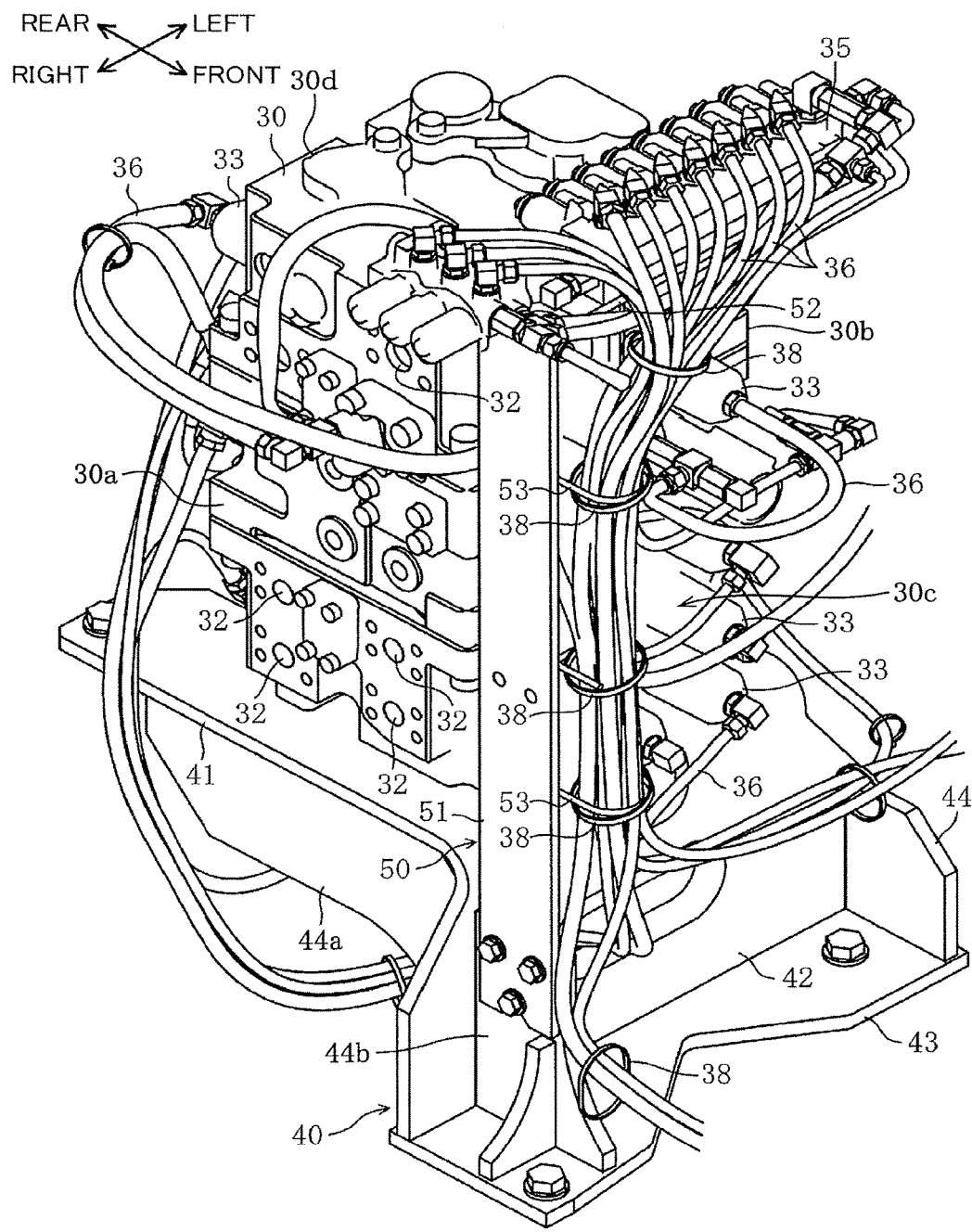
FIG. 3 is a perspective view of an arrangement structure of a control valve and a solenoid valve as seen from forward right.
Figure 4:
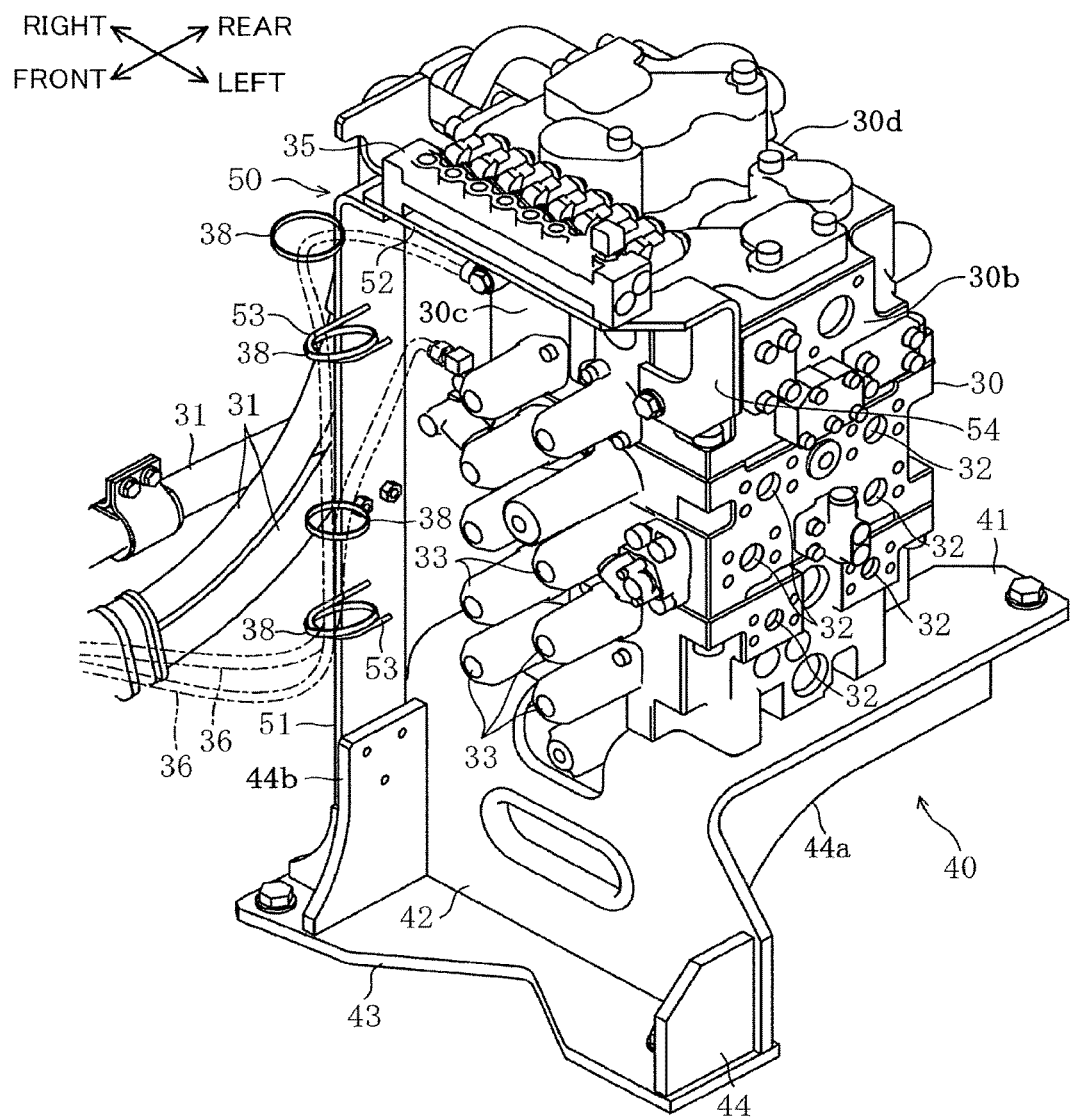
FIG. 4 is a perspective view of an arrangement structure of a control valve and a solenoid valve as seen from forward left.
Figure 5:
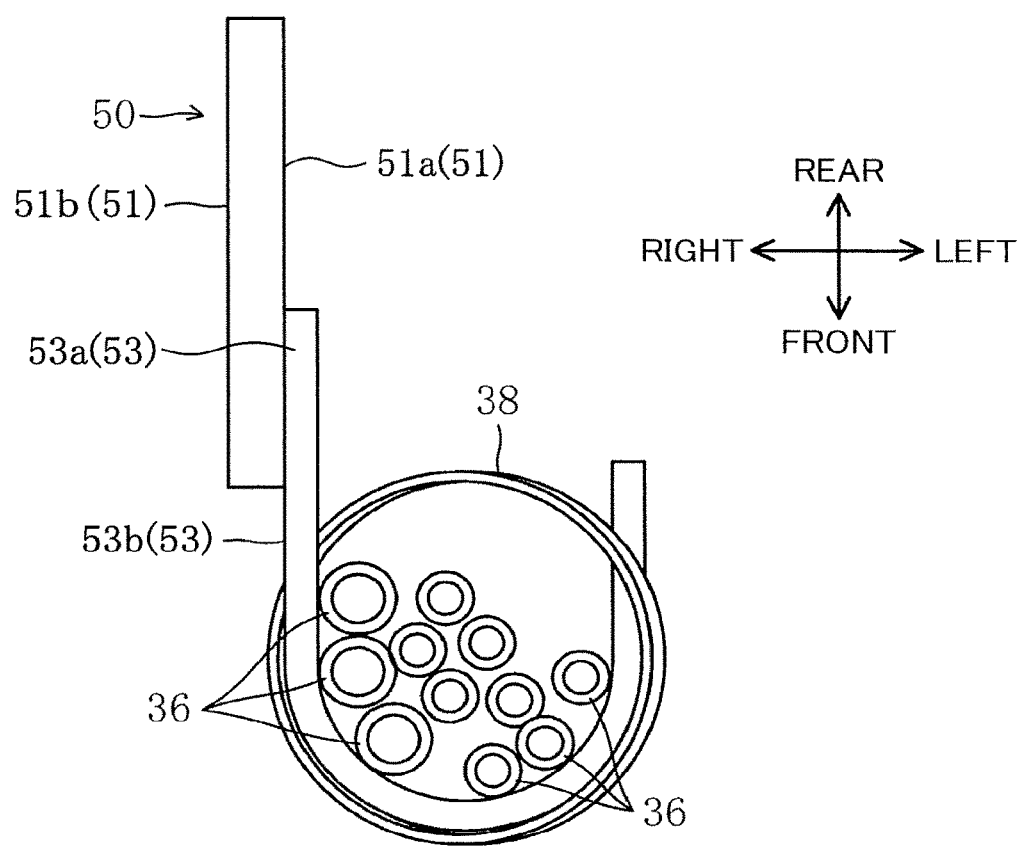
FIG. 5 is a plan view showing a configuration of a guide section.
Figure 6:
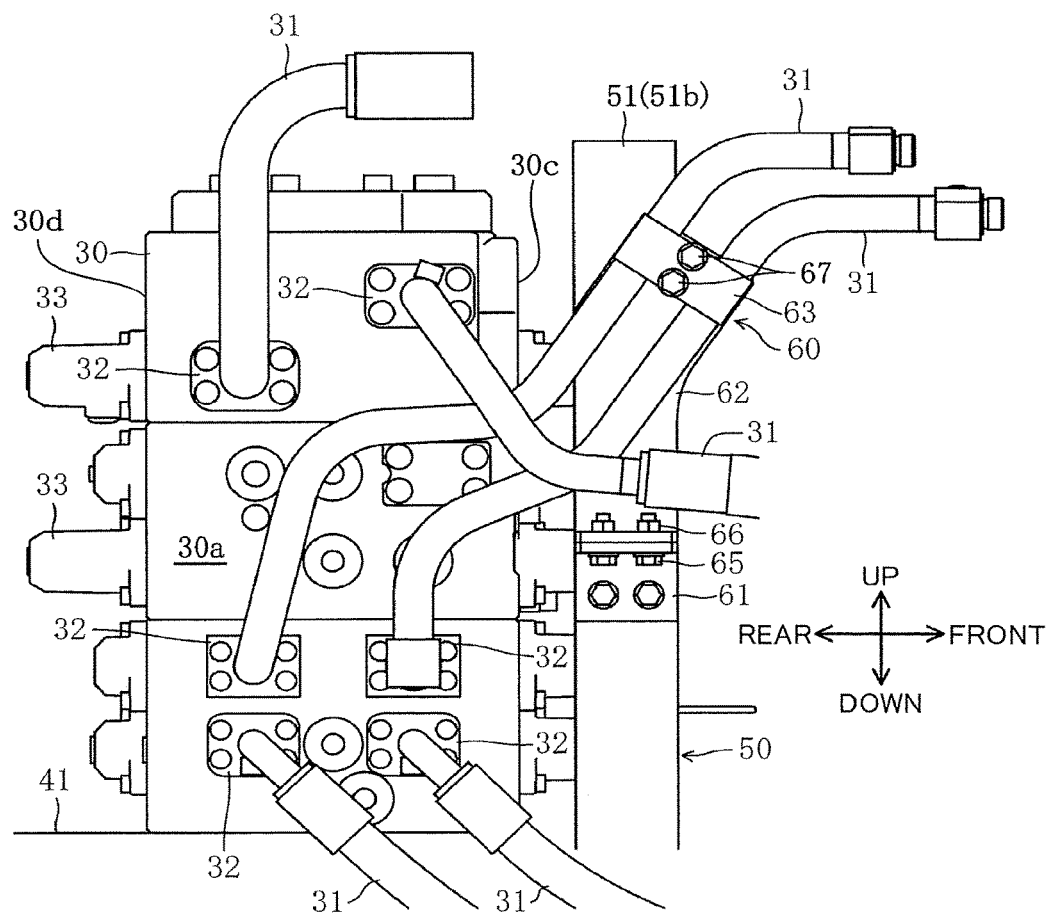
FIG. 6 is a side view showing a configuration of a clamp member.
Figure 7:
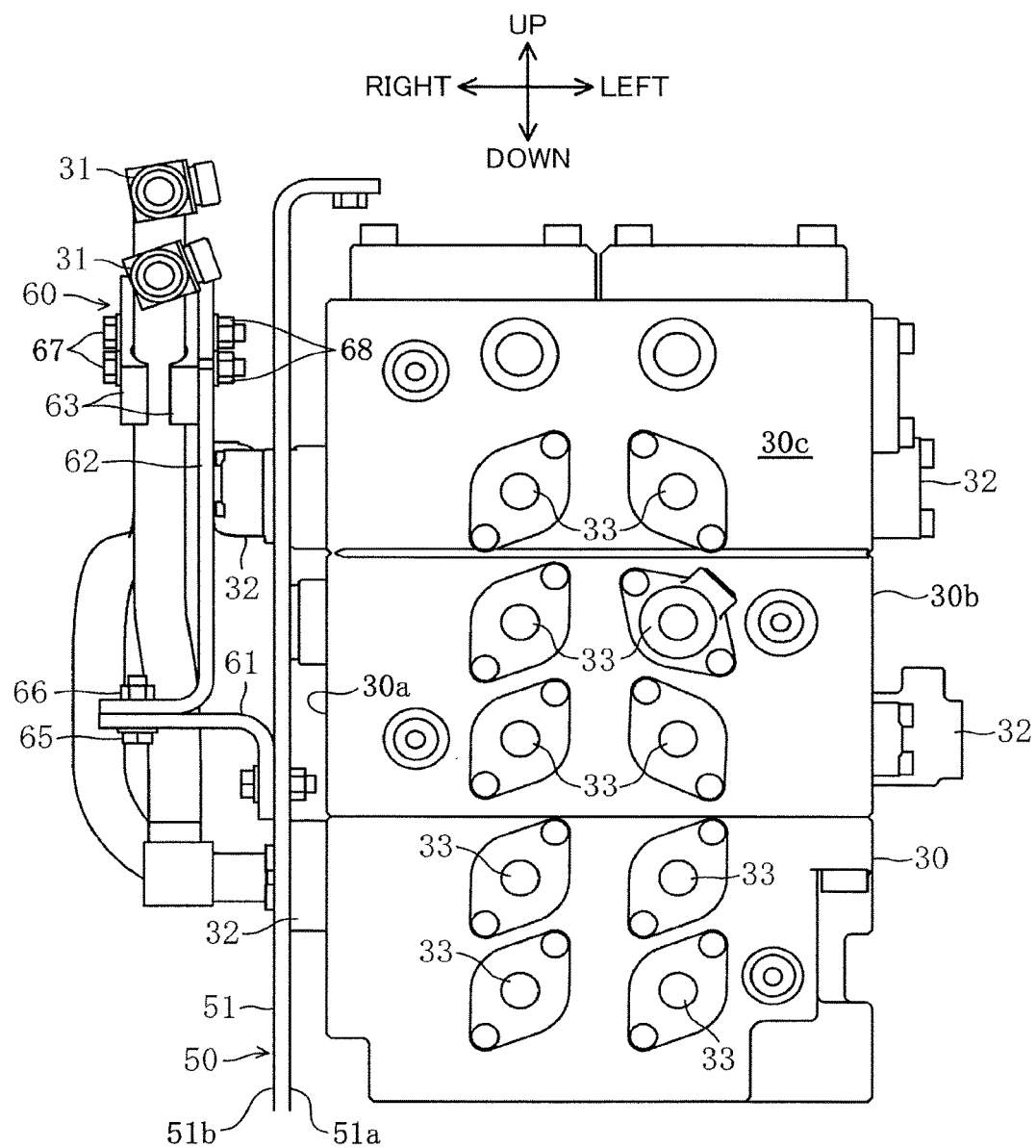
FIG. 7 is a front view showing a configuration of a clamp member.

As shown in FIGS. 3 to 5, the control valve 30 is constituted by a block body formed in an approximately rectangular parallelepiped shape.

In addition, the upper slewing body 20 includes a placing table 40 which is provided on the upper frame 21 and on which the control valve 30 is placed. In the present embodiment, the upper frame 21 and the placing table 40 correspond to the valve supporting member which supports the control valve 30 from below the control valve 30.

The placing table 40 includes a flange section 43 attached to the upper frame 21, a supporting leg 42 erected on the flange section 43, and a seat section 41 provided on the supporting leg 42.

The seat section 41 includes a placing surface (not assigned a reference numeral) on which the control valve 30 is placed. The supporting leg 42 extends downward from a front end section of the seat section 41. The flange section 43 extends forward along the upper frame 21 from a lower end section of the supporting leg 42.

In addition, the placing table 40 includes a pair of reinforcing ribs 44a provided between the seat section 41 and the supporting leg 42 and a pair of reinforcing ribs 44b provided between the supporting leg 42 and the flange section 43. Specifically, the pair of reinforcing ribs 44a provided on a lower surface of the seat section 41 is respectively provided at both left and right end sections of the seat section 41. Both reinforcing ribs 44a are welded to the lower surface of the seat section 41 and a rear surface of the supporting leg 42 in a state where the reinforcing ribs 44a straddle the lower surface of the seat section 41 and the rear surface of the supporting leg 42. In addition, the pair of reinforcing ribs 44b provided on an upper surface of the flange section 43 is respectively provided at both left and right end sections of the flange section 43. Both reinforcing ribs 44b are welded to the front surface of the supporting leg 42 and the upper surface of the flange section 43 in a state where the reinforcing ribs 44b straddle the front surface of the supporting leg 42 and the upper surface of the flange section 43.

Hydraulic ports 32 to each of which the hydraulic pipe 31 is connected are provided on a left side wall surface 30b and a right side wall surface 30a (respectively corresponding to the connection surface according to the present embodiment) of the control valve 30. Pilot ports 33 to which the pilot pipes 36 are connected are provided on a front side wall surface 30c and a rear side wall surface 30d (respectively corresponding to the pilot connection surface according to the present embodiment) of the control valve 30.

The upper slewing body 20 includes a supporting bracket 50 which supports the solenoid valve 35 so that the solenoid valve 35 is positioned above the control valve 30. The solenoid valve 35 is arranged in plurality so as to be aligned in a left-right direction on an upper surface of the supporting bracket 50.

The supporting bracket 50 includes an erected section 51, a placing section 52, two guide sections 53, and a fixed section 54.

The erected section 51 is formed by a plate material extending in a vertical direction. A lower end section of the erected section 51 is attached to the right side reinforcing rib 44b in the flange section 43 of the placing table 40. Accordingly, the erected section 51 is provided more toward the front than the seat section 41. In other words, the erected section 51 is erected at a position separated from both side wall surfaces 30a and 30b toward the front in the valve supporting member (the upper frame 21 and the placing table 40) so as not to overlap with both side wall surfaces 30a and 30b where the hydraulic ports 32 are provided in the control valve 30 in a viewpoint along a direction perpendicular to both side wall surfaces 30a and 30b. Specifically, the erected section 51 is arranged at a position separated from the control valve 30 toward the front. In addition, the erected section 51 extends in a vertical direction from the valve supporting member to a position above an upper surface of the control valve 30.

The placing section 52 extends (in a horizontal direction) from an upper end section of the erected section 51 so as to be arranged at a position above the upper surface of the control valve 30. Specifically, the placing section 52 extends from the upper end section of the erected section 51 so as to overhang horizontally towards the left. The solenoid valve 35 is placed on the placing section 52.

The guide sections 53 are provided on the erected section 51. In addition, the guide sections 53 hold the pilot pipes 36 in a bundled state so that the pilot pipes 36 are routed in a vertical direction along the erected section 51. In addition, the guide sections 53 restrict movement of the pilot pipes 36 in at least a direction separating from the control valve 30.

The guide sections 53 include a joined section 53a (refer to FIG. 5) which is joined to a left side surface of the erected section 51 and a hook section 53b (refer to FIG. 5) which is opened toward the control valve 30. The hook section 53b is formed by a portion of a rod material bent in a U shape or a J shape, and the joined section 53a is formed by a portion of the rod material extending in a straight line from the hook section. The joined section 53a is joined to the left side surface of the erected section 51 in a posture in which an opening portion of the hook section 53b faces the control valve 30 side. The two guide sections 53 are provided on the erected section 51 at an interval in the vertical direction (aligned in the vertical direction).

The fixed section 54 extends downward from an end section of the placing section 52 on an opposite side to the erected section 51 or, in other words, from a left end section of the placing section 52 and is fixed to a front side wall (the front side wall surface 30c) of the control valve 30. Accordingly, the placing section 52 of the supporting bracket 50 is supported at both end sections of the supporting bracket 50 by the erected section 51 and the fixed section 54. As a result, stiffness of the supporting bracket 50 can be enhanced. Specifically, by bending the placing section 52, the fixed section 54 is integrally formed with the placing section 52.

The plurality of pilot pipes 36 are routed in a bundled state. Specifically, the upper slewing body 20 further includes a plurality of binding bands (binding members) 38 which are wound around the plurality of pilot pipes 36 connected to the upper surface of the multiple-type solenoid valve 35 to bundle the plurality of pilot pipes 36. The plurality of pilot pipes 36 are routed in the vertical direction along the erected section 51 and respectively bundled by the binding bands 38 at a plurality of locations in a longitudinal direction of the pilot pipes 36.

In addition, the plurality of pilot pipes 36 are held by the guide sections 53 in a bundled state. Specifically, when the plurality of pilot pipes 36 are inserted to the hook sections 53b from openings of the guide sections 53, the hook sections 53b restrain the pilot pipes 36 from a front side and both left and right sides and the plurality of pilot pipes 36 are hooked (held) by the hook sections 53b in a bundled state. Moreover, while the plurality of pilot pipes 36 are bundled by the binding band 38 in the present embodiment, the plurality of pilot pipes 36 can be held by the hook sections 53b in a bundled state even when the binding band 38 is omitted. Two binding bands 38 among the plurality of binding bands 38 are wound around the plurality of pilot pipes 36 and the hook sections 53b. Accordingly, the pilot pipes 36 hooked by the guide sections 53 are fixed to the guide sections 53 by the binding bands 38.

Since the plurality of pilot pipes 36 are held by the hook section 53b in this manner, even when the pilot pipes 36 start to expand due to a force which the pilot pipes 36 receive from oil when the oil circulates through the pilot pipes 36, movement of the pilot pipes 36 is restricted by the guide sections 53.

In addition, since the hook section 53b of the guide sections 53 has a shape which is opened toward the control valve 30 side (the guide sections 53 have a portion which restricts the pilot pipes 36 from moving in the left-right direction), movement of the pilot pipes 36 in the left-right direction is also restricted. Accordingly, the guide sections 53 can hold the plurality of pilot pipes 36 in a bundled state so that the plurality of pilot pipes 36 are routed in the vertical direction and, at the same time, can restrict movement of the pilot pipes 36 in a direction (forward) separating from the control valve 30. Therefore, the pilot pipes 36 can be prevented from expanding outward (forward) and a space necessary for routing the pilot pipes 36 can be reduced.

In addition, in the present embodiment, the erected section 51 of the supporting bracket 50 is erected at a position separated from the left side wall surface 30b and the right side wall surface 30a in the horizontal direction in the valve supporting member (the upper frame 21 and the placing table 40) so as not to overlap with the side wall surfaces 30a and 30b in a viewpoint along a direction perpendicular to the side wall surfaces 30a and 30b. Accordingly, the erected section 51 and the solenoid valve 35 can be arranged in a state where the side wall surfaces 30a and 30b of the control valve 30 are opened sideways and, at the same time, the pilot pipes 36 can be held in a bundled state to the erected section 51 arranged in this manner. Therefore, since the pilot pipes 36 can be routed in an orderly manner at a position (the erected section 51) separated from the side wall surfaces 30a and 30b, a routing operation of the pilot pipes 36 can be readily performed while suppressing entanglement of the hydraulic pipe 31 and the pilot pipes 36.

In addition, movement of the pilot pipes 36 in a direction separating from the control valve 30 can be restricted by the guide sections 53 (the hook section 53b). As a result, the pilot pipes 36 can be prevented from expanding outward when oil circulates through the pilot pipes 36 and a space necessary for routing the pilot pipes 36 can be reduced.

Furthermore, the plurality of pilot pipes 36 are inserted from an opening of the hook section 53b in a state where the plurality of pilot pipes 36 are bundled so that the pilot pipes 36 are routed along the erected section 51 from the solenoid valve 35. Accordingly, the pilot pipes 36 can be engaged with (held) by the hook section 53b. In addition, since the pilot pipes 36 can be put in and out through the opening of the hook section 53b, routing operations can be more readily performed.

Furthermore, the binding band 38 is provided for fixing the plurality of pilot pipes 36 to the hook section 53b in a state where the pilot pipes 36 are bundled. Accordingly, the pilot pipes 36 can be prevented from slipping out from the hook section 53b through the opening due to vibration of the construction machine 10. Therefore, both an improvement in operability of routing of the pilot pipes 36 through the opening and a reliable hold on the pilot pipes 36 can be achieved.

As shown in FIGS. 4 to 7, the erected section 51 described above includes a guide attaching surface (a left side surface) 51a to which the guide sections 53 are attached, and a clamp attaching surface (a right side surface) 51b to which a clamp member 60 (to be described below) is attached.

The clamp member 60 is attached to the clamp attaching surface 51b of the erected section 51. The clamp member 60 clamps the hydraulic pipe 31 connected to each of the hydraulic ports 32 of the control valve 30 and holds the hydraulic pipe 31 at a prescribed height position. In the present embodiment, the clamp member 60 clamps the metallic hydraulic pipe 31 connected to the slewing motor 27.

The clamp member 60 includes a first bracket 61 which has an L-shaped section and which extends rightward from the clamp attaching surface 51b of the erected section 51, a second bracket 62 which has an L-shaped section and which is overlapped with an upper surface of the first bracket 61 and fastened to the first bracket 61 by a fastening bolt 65 and a fastening nut 66, and a pair of clamp sections 63 attached to a right side surface of the second bracket 62.

Mutually opposing surfaces of the pair of clamp sections 63 have sandwiching surfaces which are depressed in correspondence to a sectional shape of the hydraulic pipe 31. The hydraulic pipe 31 is sandwiched by the pair of clamp sections 63 when a fastening bolt 67 and a fastening nut 68 are fastened in a state where the hydraulic pipe 31 is placed between the sandwiching surfaces of the pair of clamp sections 63.

The configuration of the present embodiment will now be organized and described with respect to the control valve 30 and the placing table 40.

The pilot ports 33 to which the pilot pipes 36 are connected are provided on the front surface (a pilot connection surface) 30c which extends in a direction perpendicular to the right side wall surface (a connection surface) 30a of the control valve 30 from one end (front end) in the horizontal direction of the right side wall surface 30a.

In addition, the erected section 51 is provided at a position which is separated from the right side wall surface 30a toward the one end side (front side) of the right side wall surface 30a in the horizontal direction in a viewpoint along a direction perpendicular to the right side wall surface 30a and which is separated from the front side wall surface 30c toward the right side wall surface 30a side (right side) in the horizontal direction in a viewpoint along a direction perpendicular to the front side wall surface 30c.

Furthermore, the clamp attaching surface 51b of the erected section 51 faces a same direction as the right side wall surface 30a of the control valve 30.

Moreover, the placing section 52 extends from an upper end section of the erected section 51 toward a side (leftward) which the guide attaching surface 51a faces.

By adopting the control valve 30 and the placing table 40 configured as described above, the erected section 51 for routing the pilot pipes 36 can also be used as a member for attaching the clamp member 60 for holding the hydraulic pipe 31. In addition, since not only the pilot pipes 36 but the hydraulic pipe 31 can also be routed at a position near the supporting bracket 50, downsizing of the entire apparatus can be achieved.

Furthermore, one side of the erected section 51 (a side faced by the guide attaching surface 51a: a left side) can be used as a space for routing the pilot pipes 36 and the other side of the erected section 51 (a side faced by the clamp attaching surface 51b: a right side) can be used as a space for routing the hydraulic pipe 31. Since the erected section 51 can be used as a partition that separates the pilot pipes 36 and the hydraulic pipe 31 from each other in this manner, both pipes 31 and 36 can be routed in a more orderly manner.

The erected section 51 is provided at a position which is separated from the right side wall surface (connection surface) 30a toward the one end side (the front side wall surface 30c side: the front side) of the right side wall surface 30a in a viewpoint along a direction (left-right direction) perpendicular to the right side wall surface 30a and which is separated from the right side wall surface 30a toward a front side in the perpendicular direction (a position separated from the front side wall surface 30c toward the right side wall surface 30a side in a viewpoint along a direction perpendicular to the front side wall surface 30c: a right side position).

In this case, since the clamp attaching surface 51b is arranged more toward the front side than the right side wall surface 30a in the perpendicular direction so as to face a same direction as the right side wall surface 30a, an intermediate section of the hydraulic pipe 31 which extends rightward from the right side wall surface 30a can be readily guided to the clamp member 60 while avoiding entanglement with the pilot pipes 36.

In addition, since the guide attaching surface 51a is arranged facing the front side wall surface 30c side, a distal end section of the pilot pipes 36 held by the erected section 51 can be readily guided to the pilot ports 33.

Since the placing section 52 is arranged above a space partitioned from a space for routing the hydraulic pipe 31 by the erected section 51, the pilot pipes 36 can be efficiently guided downward from the solenoid valve 35 on the placing section 52 to the guide sections 53.

Other Embodiments

The embodiment described above may be configured as follows.

While an example provided with two guide sections 53 has been described, the number of the guide sections 53 is not limited thereto. As long as the guide section 53 is capable of holding the pilot pipes 36 in a bundled state so that the pilot pipes 36 are routed in the vertical direction along the erected section 51 and, at the same time, capable of restricting movement of the pilot pipes 36 in at least a direction separating from the control valve 30, one guide section 53 or three or more guide sections 53 may be provided.

While an example in which the erected section 51 is erected on the placing table 40 has been described in the embodiment presented above, the erected section 51 may be erected on the valve supporting member (the upper frame 21 and the placing table 40) which supports the control valve 30 from below the control valve 30.

While the guide section 53 including the hook section 53b has been described, a configuration for holding the pilot pipes 36 in a bundled state so that the pilot pipes 36 are routed in the vertical direction along the erected section 51 and, at the same time, restricting movement of the pilot pipes 36 in a direction separating from the control valve 30 is not limited to the hook section 53b. Alternatively, a guide section 53 including a portion formed in a loop shape can be adopted.

While a configuration including the binding band 38 and the clamp member 60 has been described, at least one of these components may be omitted.

Figure 8:
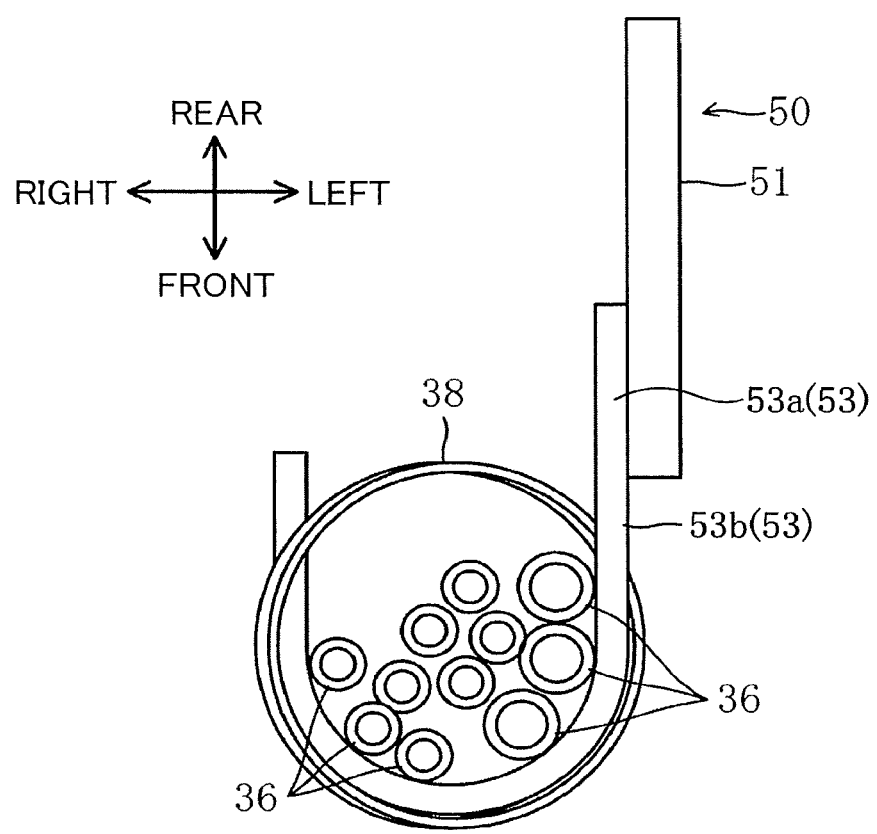
FIG. 8 is a plan view showing a configuration of a guide section according to another embodiment.

While a configuration in which the guide section 53 is joined to a left side surface of the erected section 51 has been described in the embodiment presented above, for example, a configuration in which the guide section 53 is joined to a right side surface of the erected section 51 as shown in FIG. 8 may be adopted instead. In this case, the clamp member 60 may be provided on the right side surface of the erected section 51.

On the other hand, in a configuration in which the guide section 53 is provided on the left side surface of the erected section 51 in a similar manner to the embodiment described above, the clamp member 60 may be provided on the left side surface of the erected section 51.

While the placing section 52 extending leftward from the erected section 51 has been described, a direction in which the placing section 52 extends is not limited to the leftward direction as long as the placing section 52 is arranged above the upper surface of the control valve 30.

While the supporting bracket 50 including the fixed section 54 has been described, the fixed section 54 can be omitted. In this case, the placing section 52 is to be supported by the erected section 51 in a cantilevered manner.

The specific embodiment described above mainly includes an invention configured as described below.

The present invention provides a valve arrangement structure of a construction machine, including: a control valve connected to a hydraulic device via a hydraulic pipe; a solenoid valve connected to the control valve via a plurality of pilot pipes; a valve supporting member which supports the control valve from below the control valve; and a supporting bracket which supports the solenoid valve so that the solenoid valve is positioned above the control valve, wherein a hydraulic port to which the hydraulic pipe is connected is provided on a lateral connection surface of the control valve, and the supporting bracket includes: an erected section which is erected at a position separated from the connection surface of the valve supporting member in a horizontal direction so as not to overlap with the connection surface in a viewpoint along a direction perpendicular to the connection surface and which extends in a vertical direction from the valve supporting member to a position higher than an upper surface of the control valve; a placing section which extends from an upper end section of the erected section so as to be arranged at a position higher than the upper surface of the control valve and on which the solenoid valve is placed; and at least one guide section which is provided in the erected section, which holds the pilot pipes in a bundled state so that the pilot pipes are routed in the vertical direction along the erected section, and which restricts the pilot pipes from moving in at least a direction separating from the control valve.

In the present invention, the solenoid valve is supported by the supporting bracket at a position above the control valve. In addition, the erected section of the supporting bracket is arranged at a position separated from the control valve in a horizontal direction. Furthermore, the pilot pipes are held by the guide section in a bundled state so that the pilot pipes are routed in a vertical direction along the erected section.

According to the present invention configured as described above, the erected section and the solenoid valve can be arranged in a state where the connection surface of the control valve is opened sideways and, at the same time, the pilot pipes can be held in a bundled state to the erected section arranged in this manner. Therefore, since the pilot pipes can be routed in an orderly manner at a position (the erected section) separated from the connection surface (the hydraulic pipe), a routing operation of the pilot pipes can be readily performed while suppressing entanglement of the hydraulic pipe and the pilot pipes.

In addition, movement of the pilot pipes in at least a direction separating from the control valve can be restricted by the guide section. As a result, the pilot pipes can be prevented from expanding outward when oil circulates through the pilot pipes and a space necessary for routing the pilot pipes can be reduced.

In the valve arrangement structure of a construction machine described above, favorably, the guide section includes a hook section which is opened toward the control valve.

According to this aspect, the guide section includes the hook section. The plurality of pilot pipes are inserted from the opening of the hook section in a state where the plurality of pilot pipes are bundled so that the pilot pipes are routed along the erected section from the solenoid valve. Accordingly, the pilot pipes can be engaged with (held) by the hook section. In addition, since the pilot pipes can be put in and out through the opening of the hook section, routing operations can be more readily performed.

Favorably, the valve arrangement structure of a construction machine described above further includes a binding member which fixes the plurality of pilot pipes in a bundled state to the hook section by being wound around the plurality of pilot pipes and the hook section.

According to this aspect, the pilot pipes can be prevented from slipping out from the hook section through the opening due to vibration of the construction machine and the like. Therefore, as described above, both an improvement in operability of routing of the pilot pipes through the opening and a reliable hold on the pilot pipes can be achieved.

In the valve arrangement structure of a construction machine described above, favorably, the erected section is provided with a clamp member which holds the hydraulic pipe.

In this aspect, the hydraulic pipe is held by the clamp member provided in the erected section. Accordingly, the erected section for routing the pilot pipes can also be used as a member for attaching the clamp member for holding the hydraulic pipe. In addition, since not only the pilot pipes but the hydraulic pipe can also be routed at a position near the supporting bracket, downsizing of the entire apparatus can be achieved.

In the valve arrangement structure of a construction machine described above, favorably, the erected section includes a guide attaching surface to which the guide section is attached, and a clamp attaching surface which faces an opposite side to the guide attaching surface and to which the clamp member is attached.

According to this aspect, one side of the erected section (a side faced by the guide attaching surface) can be used as a space for routing the pilot pipes and the other side of the erected section (a side faced by the clamp attaching surface) can be used as a space for routing the hydraulic pipe. Since the erected section can be used as a partition that separates the pilot pipes and the hydraulic pipe from each other in this manner, both pipes can be routed in a more orderly manner.

In the valve arrangement structure of a construction machine described above, favorably, a pilot port to which each of the pilot pipes is connected is provided on a pilot connection surface which extends in a direction perpendicular to the connection surface of the control valve from one end in the horizontal direction of the connection surface, the erected section is provided at a position which is separated from the connection surface toward a one end side of the connection surface in a horizontal direction in the viewpoint along the direction perpendicular to the connection surface and which is separated from the pilot connection surface toward the connection surface side in the horizontal direction in a viewpoint along a direction perpendicular to the pilot connection surface, and the clamp attaching surface faces a same direction as the connection surface.

In this aspect, the erected section is provided at a position which is separated from the connection surface toward a one end side of the connection surface (the pilot connection surface side) in a viewpoint along a direction perpendicular to the connection surface and which is separated from the connection surface toward a front side in the perpendicular direction (a position separated from the pilot connection surface toward the connection surface side in a viewpoint along a direction perpendicular to the pilot connection surface).

In this case, since the clamp attaching surface is arranged more toward the front side than the connection surface in the perpendicular direction so as to face a same direction as the connection surface, an intermediate section of the hydraulic pipe which extends in the perpendicular direction from the connection surface can be readily guided to the clamp member while avoiding entanglement with the pilot pipes.

In addition, since the guide attaching surface is arranged facing the pilot connection surface side, a distal end section of the pilot pipes held by the erected section can be readily guided to the pilot port.

In the valve arrangement structure of a construction machine described above, favorably, the placing section extends from the upper end section of the erected section toward a side faced by the guide attaching surface.

According to this aspect, since the placing section is arranged above a space partitioned from a space for routing the hydraulic pipe by the erected section, the pilot pipes can be efficiently guided downward from the solenoid valve on the placing section to the guide section.

In the valve arrangement structure of a construction machine described above, favorably, the supporting bracket includes a fixed section which extends downward from an end section of the placing section on an opposite side to the erected section and which is fixed to the control valve.

According to this aspect, since both ends of the placing section of the supporting bracket is supported by the erected section and the fixed section, stiffness of the supporting bracket can be increased and the solenoid valve can be prevented from vibrating.

Favorably, the valve arrangement structure of a construction machine described above further includes a plurality of guide sections provided on the erected section so as to be aligned in the vertical direction.

According to this aspect, the pilot pipes can be reliably routed along the erected section by the plurality of guide sections.

According to the present invention, routing of the pilot pipes can be performed while suppressing entanglement with the hydraulic pipe and a space necessary for routing of the pilot pipes can be reduced.

This application is based on Japanese Patent application No. 2016-038664 filed in Japan Patent Office on Mar. 1, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A valve arrangement structure of a construction machine, comprising:
    a control valve connected to a hydraulic device via a hydraulic pipe;
    a solenoid valve connected to the control valve via a plurality of pilot pipes;
    a valve supporting member which supports the control valve from below the control valve; and
    a supporting bracket which supports the solenoid valve so that the solenoid valve is positioned above the control valve, wherein
    a hydraulic port to which the hydraulic pipe is connected is provided on a lateral connection surface of the control valve, and
    the supporting bracket includes:
    an erected section which is erected at a position separated from the connection surface of the control valve in a horizontal direction so as not to overlap with the connection surface in a viewpoint along a direction perpendicular to the connection surface and which extends in a vertical direction from the valve supporting member to a position higher than an upper surface of the control valve;
    a placing section which extends from an upper end section of the erected section so as to be arranged at a position higher than the upper surface of the control valve and on which the solenoid valve is placed; and
    at least one guide section which is provided in the erected section, which holds the pilot pipes in a bundled state so that the pilot pipes are routed in the vertical direction along the erected section, and which restricts the pilot pipes from moving in at least a direction separating from the control valve.

2. The valve arrangement structure of a construction machine according to claim 1, wherein
    the guide section includes a hook section which is opened toward the control valve.

3. The valve arrangement structure of a construction machine according to claim 2, further comprising a binding member which fixes the plurality of pilot pipes in a bundled state to the hook section by being wound around the plurality of pilot pipes and the hook section.

4. The valve arrangement structure of a construction machine according to claim 1, wherein the erected section is provided with a clamp member which holds the hydraulic pipe.

5. The valve arrangement structure of a construction machine according to claim 4, wherein
the erected section includes a guide attaching surface to which the guide section is attached, and a clamp attaching surface which faces an opposite side to the guide attaching surface and to which the clamp member is attached.

6. The valve arrangement structure of a construction machine according to claim 5, wherein
a pilot port to which each of the pilot pipes is connected is provided on a pilot connection surface which extends in a direction perpendicular to the connection surface of the control valve from one end in the horizontal direction of the connection surface,
the erected section is provided at a position which is separated from the connection surface toward a one end side of the connection surface in a horizontal direction in the viewpoint along the direction perpendicular to the connection surface and which is separated from the pilot connection surface toward the connection surface side in the horizontal direction in a viewpoint along a direction perpendicular to the pilot connection surface, and
the clamp attaching surface faces a same direction as the connection surface.

7. The valve arrangement structure of a construction machine according to claim 5, wherein
the placing section extends from the upper end section of the erected section toward a side faced by the guide attaching surface.

8. The valve arrangement structure of a construction machine according to claim 1, wherein
the supporting bracket includes a fixed section which extends downward from an end section of the placing section on an opposite side to the erected section and which is fixed to the control valve.

9. The valve arrangement structure of a construction machine according to claim 1, further comprising a plurality of guide sections provided on the erected section so as to be aligned in the vertical direction.

* * * * *